(12) United States Patent
Blaney et al.

(10) Patent No.: US 12,304,843 B2
(45) Date of Patent: May 20, 2025

(54) PHOSPHOROUS EXTRACTION AND RECOVERY SYSTEM

(71) Applicant: UNIVERSITY OF MARYLAND, BALTIMORE COUNTY, Baltimore, MD (US)

(72) Inventors: Lee Blaney, Baltimore, MD (US); Utsav Shashvatt, Baltimore, MD (US); Charles Portner, Baltimore, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 517 days.

(21) Appl. No.: 17/712,455

(22) Filed: Apr. 4, 2022

(65) Prior Publication Data

US 2022/0227652 A1 Jul. 21, 2022

Related U.S. Application Data

(63) Continuation of application No. PCT/US2019/054755, filed on Oct. 4, 2019.

(51) Int. Cl.
*C02F 11/121* (2019.01)
*B01D 33/03* (2006.01)
(Continued)

(52) U.S. Cl.
CPC ............ *C02F 11/121* (2013.01); *B01D 33/03* (2013.01); *B01J 8/005* (2013.01); *B01J 10/002* (2013.01); *B01J 19/18* (2013.01); *C02F 1/20* (2013.01); *C02F 1/5209* (2013.01); *C02F 1/5236* (2013.01); *C02F 1/5281* (2013.01); *C02F 2101/105* (2013.01); *C02F 2101/16* (2013.01); *C02F 2103/20* (2013.01); *C02F 2301/08* (2013.01)

(58) Field of Classification Search
CPC ........ C02F 1/5236; C02F 1/66; C02F 1/5209; C02F 1/5281; C02F 2103/20; C02F 2101/16; C02F 2301/08; C02F 1/20; C02F 11/121; B01D 33/03; B01J 8/005; B01J 10/02; B01J 19/18
USPC .......................................... 210/724, 738, 906
See application file for complete search history.

(56) References Cited

U.S. PATENT DOCUMENTS

| 4,826,017 A | 5/1989 | Du Bourg et al. |
| 6,387,272 B2 | 5/2002 | Hirth et al. |

(Continued)

FOREIGN PATENT DOCUMENTS

| WO | WO 2011/089019 | 7/2011 | |
| WO | WO-2011089019 A1 * | 7/2011 | ............ C02F 11/04 |

OTHER PUBLICATIONS

International Search Report for PCT/US2019/054755. Mailed Dec. 4, 2019. 2 pages.

(Continued)

*Primary Examiner* — Claire A Norris
(74) *Attorney, Agent, or Firm* — Casimir Jones, S.C.; Tristan A. Fuierer (57) ABSTRACT

Separation methods and systems for converting high concentrations of animal wastes and other nutrient-rich organic materials into nutrients and other useful products such as struvite and potassium struvite. Advantageously, the system and methods do not require the addition of external chemicals other than an acid and a base.

20 Claims, 3 Drawing Sheets

(51) Int. Cl.
  *B01J 8/00* (2006.01)
  *B01J 10/00* (2006.01)
  *B01J 19/18* (2006.01)
  *C02F 1/20* (2023.01)
  *C02F 1/52* (2023.01)
  *C02F 101/10* (2006.01)
  *C02F 101/16* (2006.01)
  *C02F 103/20* (2006.01)

(56) References Cited

U.S. PATENT DOCUMENTS

| | | |
|---|---|---|
| 7,014,768 B2 | 3/2006 | Li et al. |
| 10,464,852 B2 | 11/2019 | Blaney et al. |
| 11,104,617 B2 | 8/2021 | Blaney et al. |
| 2002/0030012 A1 | 3/2002 | Sullivan et al. |
| 2005/0045557 A1 | 3/2005 | Daigger et al. |
| 2005/0051495 A1 | 3/2005 | Bowers et al. |
| 2007/0175825 A1 | 8/2007 | Denney |
| 2012/0018374 A1 | 1/2012 | Sun et al. |
| 2012/0031849 A1 | 2/2012 | Britton |
| 2012/0261334 A1 | 10/2012 | Baur |
| 2012/0261338 A1 | 10/2012 | Kuzuma et al. |
| 2013/0062289 A1 | 3/2013 | Cote et al. |
| 2013/0334144 A1 | 12/2013 | Britton |
| 2014/0231359 A1 | 8/2014 | Cote et al. |
| 2015/0017085 A1 | 1/2015 | Britton et al. |
| 2016/0130191 A1 | 5/2016 | Clark et al. |
| 2017/0174577 A1 | 6/2017 | Blaney |
| 2017/0327427 A1* | 11/2017 | Blaney ............ B01D 61/246 |

OTHER PUBLICATIONS

Blaney et al., Hybrid anion exchanger for trace phosphate removal from water and wastewater. Water research, 2007, vol. 41. pp. 1603-1613.

He et al., Detection of a wide variety of human and veterinary fluoroquinolone antibiotics in municipal wastewater and wastewater-impacted surface water. Journal of Pharmaceutical and Biomedical Analysis. 2015; vol. 106. pp. 136-143.

Ostara Pearl. Nutrient Recovery Technology Customized to Meet Your Needs; Ostara Nutrient Recovery Technologies, Inc. www.ostara.com. 2 pages.

Portner et al., Optimizing and automating the pilot-scale phosphorus extraction and recovery system. American chemical Society National Meeting & Expo. 2019. 21 pages.

* cited by examiner

PHOSPHOROUS EXTRACTION AND RECOVERY SYSTEM

CROSS-REFERENCE TO RELATED APPLICATIONS

This application is filed under the provisions of 35 U.S.C. § 111(a) and is a continuation of International Patent Application No. PCT/US2019/054755, filed on 4 Oct. 2019 entitled "Phosphorous Extraction and Recovery System" in the name of Lee BLANEY et al., which is hereby incorporated by reference herein in its entirety.

STATEMENT REGARDING FEDERALLY SPONSORED RESEARCH

Funding for development of portions of this technology came from the Maryland Industrial Partnerships program and the Maryland Department of Natural Resources. Additional portions of this invention were made with government support under Grant No. NSF CBET-1511667 awarded by the National Science Foundation. The government may have certain rights in the invention.

FIELD OF THE INVENTION

The present invention relates generally to the problems associated with waste in animal confinements, and more specifically, to separation methods and systems for converting high concentrations of animal wastes and other nutrient-rich organic material into nutrients and other useful products.

BACKGROUND OF THE INVENTION

The cleanup and handling of cattle, swine, and poultry manure has become a critical issue in the management and disposal of animal waste. Animals have been raised for centuries for food and previously such animals grazed in fields or pens. Current methods of raising livestock include housing in high concentrations within a confined space. Numerous drawbacks of such confinement include high concentrations of waste that must be removed from the confined space. The manure produced must be removed regularly to ensure adequate sanitation and to prevent disease.

When solid waste is used as fertilizer in fields, increased levels of phosphorus, nitrogen, and potassium are found in the soils. When liquid waste is used as fertilizer in fields, increased levels of nitrogen rich ammonium and ammonia are found in the soils. Either scenario may result in the leaching of such chemicals into drainage waters and run-off streams.

There has been increasing publicity and stricter environmental requirements and enforcement because of the continuing concern over maintaining water quality in watershed areas due to the release of manure as normal operational discharges from dairy cattle, beef cattle, swine, poultry and other concentrated animal feeding operations. Current technologies for separating solids and nutrient components of such animal waste have limitations, are costly to operate, and result in the use of large quantities of fuel and labor in order to provide solid and water-based effluents that can either be recycled or are environmentally acceptable to spread on farmlands.

Accordingly, there is currently a need for an improved process and separation system for treating animal waste and other nutrient-rich organic materials that is low in capital equipment cost, low in waste transportation cost, prevents pollution of water resources, simple to operate, and that provides solid and liquid effluents containing beneficial and useful nutrients critical for food production.

SUMMARY OF THE INVENTION

The present invention relates to extraction systems and methods to process a manure source containing urine and fecal matter from cows, swine, sheep, goats, poultry, horses, rabbits, and other animals to provide target products including, but not limited to, ammonia, struvite, and/or potassium struvite. In addition, other nutrient-rich organic materials can be processed for the extraction of the nutrients.

In one aspect, a phosphorus extraction and recovery system (PEARS) is described, said system comprising:
  (a) at least one reaction vessel comprising a mixer, wherein the at least one reaction vessel and the mixer are substantially inert to an acidic solution, a basic solution, or both;
  (b) at least one solid-liquid separation module in fluid communication with at least one reaction vessel, wherein the at least one solid-liquid separation module separates contents of at least one reaction vessel into a substantially solid fraction and a substantially liquid fraction;
  (c) at least one container in communication with at least one solid-liquid separation module, wherein solids from the at least one solid-liquid separation module are collected in the at least one container; and
  (d) optionally a liquid conduit connecting at least one reaction vessel to at least one solid-liquid separation module for directing liquid from at least one solid-liquid separation module to at least one reaction vessel.

The PEARS system can further comprise at least one of:
  (i) a carbon dioxide bubbler;
  (ii) a first container in liquid communication with the at least one reaction vessel, wherein the first container is fabricated of material that is inert to an acidic solution, a basic solution, or both;
  (iii) an air bubbler;
  (iv) a second container in communication with the at least one solid-liquid separation module, wherein solids from the at least one solid-liquid separation module are collected in the second container;
  (v) at least one pump;
  (vi) at least one multi-parameter meter positioned in the at least one reaction vessel;
  (vii) an ammonia scrubbing module in gaseous communication with the at least one reaction vessel; and
  (viii) a manure-to-energy module.

In another aspect, a phosphorus extraction and recovery system (PEARS) is described, said system comprising:
  (a) an extraction reaction vessel comprising a first mixer, wherein each of the components of the extraction reaction vessel are substantially inert to an acidic solution;
  (b) at least one solid-liquid separation module in fluid communication with the extraction reaction vessel, wherein the at least one solid-liquid separation module separates contents of the extraction reaction vessel into a substantially solid fraction and a substantially liquid fraction;
  (c) a precipitation reaction vessel positioned to receive the substantially liquid fraction from the at least one solid-liquid separation module, wherein the precipitation reaction vessel comprises a second mixer, wherein each of the components of the precipitation reaction vessel are substantially inert to a basic solution;
(d) a second solid-liquid separation module in fluid communication with the precipitation reaction vessel, wherein the second solid-liquid separation module separates contents of the precipitation reaction vessel into a substantially solid fraction and a substantially liquid fraction; and
(e) an optional liquid conduit connecting the second solid-liquid separation module to the extraction reaction vessel for directing liquid from the second solid-liquid separation module to the extraction reaction vessel.

The PEARS system can further comprise at least one of:
(i) a carbon dioxide bubbler;
(ii) a first container in liquid communication with the extraction reaction vessel, wherein the first container is fabricated of material that is inert to an acidic solution;
(iii) an air bubbler;
(iv) a second container in liquid communication with the precipitation reaction vessel, wherein the second container is fabricated of material that is inert to a basic solution;
(v) a third container in communication with the second solid-liquid separation module, wherein solids from the second solid-liquid separation module are collected in the third container;
(vi) a fourth container in communication with the at least one solid-liquid separation module, wherein solids from the first solid-liquid separation module are collected in the fourth container;
(vii) at least one pump positioned between the precipitation reaction vessel and the extraction reaction vessel;
(viii) at least one pump positioned between the precipitation reaction vessel and the third container;
(ix) a first multi-parameter meter positioned in the extraction reaction vessel;
(x) a second multi-parameter meter positioned in the precipitation reaction vessel;
(ix) an ammonia scrubbing module in gaseous communication with the precipitation reaction vessel; and/or
(xii) a manure-to-energy module positioned downstream of the fourth container.

In another aspect, a process for treating manure, sewage sludge, or other nutrient-rich organic material in order to isolate a target precipitate is described, the process comprising:
(a) introducing a slurry in an extraction reaction vessel, wherein pH of the slurry is lowered to a range of about 3.5 to about 5.5, wherein the slurry is mixed in the extraction reaction vessel to instigate nutrient release from the slurry, wherein the slurry comprises manure, sewage sludge, or other nutrient-rich organic material;
(b) separating the slurry into a nutrient-rich liquid and a nutrient-deficient solid using at least one solid-liquid separation module;
(c) directing the nutrient-rich liquid to a precipitation reaction vessel;
(d) inducing precipitation of a target precipitate in the precipitation reaction vessel by raising pH of the nutrient-rich liquid to a range of greater than 7.0 to about 10; and
(e) collecting the target precipitate from the precipitation reaction vessel;
wherein the extraction reaction vessel and the precipitation reaction vessel are the same vessel or two different vessels.

Other aspects, features and embodiments of the invention will be more fully apparent from the ensuing disclosure and appended claims.

DETAILED DESCRIPTION, AND PREFERRED EMBODIMENTS THEREOF

The present invention relates to extraction systems and methods to process a manure source containing urine and fecal matter from cows, swine, sheep, goats, poultry, horses, rabbits, and other animals to provide target products including, but not limited to, ammonia, struvite, and/or potassium struvite.

The term "manure" refers to any medium that includes animal waste or other nutrient-rich organic material and may also include but is not limited to water, feed, urine, fecal matter, straw, hay, bedding material, peat moss, composts, sewage sludge, and food waste. Manure characteristics are generally affected by diet, species, and the growth stage of the animals and the manure collection method used. Typically, animal waste manure is about 80% to about 95% liquid by weight due to urine, sloppy drinking, animal washing, and flush water. As such, the manure medium may be pretreated with a mechanical system to remove any unwanted material, larger solids, and excess liquids from the manure medium before introduction into the system of the present invention, wherein the pretreating includes systems such as screw press, centrifuge, vibrating screen, mesh screening, belt filter, hydrocyclone, and other systems that may further reduce particle size and/or remove unwanted large material to ensure easy flow through the system described herein.

As defined herein, a "mixer" includes, but is not limited to, top stirrers/mixers, bottom stirrers/mixers, side stirrers/mixers, paddle-type mixers, screw agitators, rotary mixers, sonication, ultrasonic energy, blenders, blades, dispersers, rotors, propellers, recirculators, baffles, impellers, internal fins, or augers within a reactor that result in mixing of the contents therein.

As defined herein, "struvite" ($MgNH_4PO_4 \cdot 6H_2O$) and "potassium struvite" ($KMgPO_4 \cdot 6H_2O$) are known to have a specific chemical formula with a specific stoichiometric ratio of atoms to one another. It should be appreciated by the person skilled in the art that atomic substitutions can occur in the crystals. Preferably, the struvite recovered has an atomic ratio of N:P of about 1:1 while the potassium struvite recovered has an atomic ratio of K:P of about 1:1. It would also be appreciated by the person skilled in the art that a mixture of struvite and potassium struvite could be recovered when the manure being treated contains both N and K in varying ratios, or when these elements are added to the recovery reactor in varying ratios.

As defined herein, a "membrane module" corresponds to a module or unit comprising a microfiltration membrane. Microfiltration membranes are well known in the art and include cross-flow filtration or dead-end filtration. Microfiltration membranes may be made of any suitable materials, such as a material selected from the group consisting of polymers, such as polypropylene, polyethylene, polysulfone, polyethersulfone, polyetherimide, polyimide, polycarbonate, polyvinylchloride, polyester, etc.; nylon, silicone, urethane, cellulose nitrate, cellulose acetate, regenerated cellulose, polyether amide, polyphenylene oxide/polysulfone blends, mixed esters of cellulose, polyether sulfone, and composites of such materials. The filter membrane sheets used in the microfiltration membranes may be of any suitable porosity rating.

As defined herein, a "solid-liquid separation module" corresponds to one or more of gravity settling, enhanced settling (e.g., addition of coagulation and flocculation agents), physical separation (e.g., sieve, screen, vibratory dewatering sieve, centrifuge, flotation, hydrocyclone, mesh screening), dewatering operations (e.g., belt press, screw press, filter press, gravity belt thickener, gravity filtration device, vacuum filtration device), or other systems that remove particles from water.

As defined herein, a "container" includes, but is not limited to, gaylords, drums, tanks, bags, barrels, boxes, hoppers, supersacks, bins, bottles, and cylinders.

As defined herein, a "fluid" comprises a liquid having substantially no solid particles to an amount of solid particles in the liquid such that a slurry is formed and the fluid can flow or is pumpable.

The system and individual compartments may be fabricated from any material that does not interact with any ions in the waste stream, the recovery stream, or the reactive chemical reservoirs including, but not limited to, polymeric, metallic or ceramic material. Plastic, coated steel, and/or stainless steel components are preferred.

The present invention generally relates to the recovery of struvite-based minerals from manure, e.g., poultry litter, using a phosphorus extraction and recovery system (PEARS). Phosphorus and other nutrients can be selectively extracted from animal manure and concentrated in high-purity solutions and solids. For example, the chemical conditions in the recovery solution can cause precipitation of valuable fertilizers, such as struvite ($MgNH_4PO_4 \cdot 6H_2O$) or potassium struvite ($KMgPO_4 \cdot 6H_2O$). Advantageously, the present system can eliminate the requirement for the addition of chemicals, such as $Ca^{2+}$, $Mg^{2+}$, and $NH_4^+$.

In general, the system includes a reaction vessel where the acidification/extraction reactions occur and a reaction vessel where the precipitation of nutrient-rich minerals occurs. The acidification vessel and the precipitation vessel can be the same vessel or different vessels. The system can be controlled using a supervisory control and data acquisition (SCADA) system or equivalent thereof (not shown). A SCADA device is a computer-based system that monitors and controls industrial, infrastructure and facility-based processes. The reaction vessels can be lab-scaled or industrial-scaled in size. The reaction vessels can further comprise at least one of a mixer, a $CO_2$ gas bubbler for acidification, an air bubbler for precipitation, at least one solid-liquid separation device, at least one container, at least one pump, and at least one switch.

Figure 1:
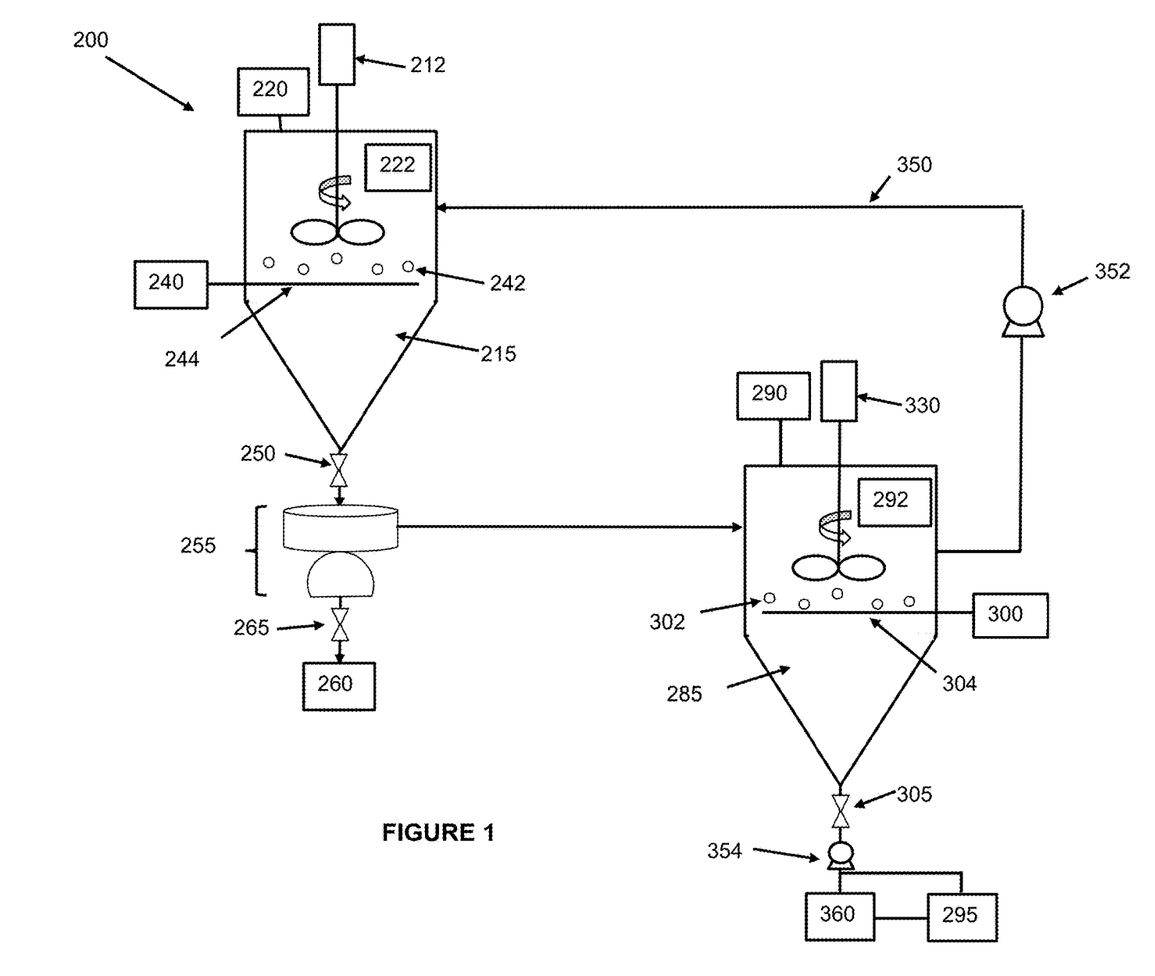
FIG. 1 is a schematic of a first embodiment of the PEARS v2 system.

In a first aspect, the PEARS system (200) is described, a generic schematic of which is shown in FIG. 1 (hereinafter PEARS v2). In the system, the acidification/extraction reactions occur in reaction vessel #1 (215) and the precipitation of nutrient-rich minerals occurs in reaction vessel #2 (285). The system can be controlled using a supervisory control and data acquisition (SCADA) system or equivalent thereof (not shown). A SCADA device is a computer-based system that monitors and controls industrial, infrastructure and facility-based processes. The reaction vessels (215, 285) can be lab-scaled or industrial-scaled in size. For example, the SCADA device can be a Matlab-USB interfaced programmable logic controller and data acquisition chassis outfitted with digital-digital I/O, analogue I/O, and electromechanical relay modules, or a programmable logic controller (PLC) commercially available from several vendors.

Slurries are prepared in, or delivered to, reaction vessel #1 (215). The slurry comprises manure, sewage sludge, or other nutrient-rich organic material. Preferably, the slurry is prepared in reaction vessel #1 (215). The slurry can have a solids concentration of from about 10 g/L to about 1000 g/L, preferably about 40 g/L to about 250 g/L. The slurry can be mixed in reaction vessel #1 using a mixer, preferably using an overhead mixer (212) or a paddle-type mixer, to decrease the particle size of the solids, e.g., manure, and instigate nutrient release. In reaction vessel #1 (215), the slurry is extracted of nutrients by introducing $CO_2$ and acid thereto. In one embodiment, $CO_2$ (240) is introduced to the slurry first for a sufficient time. Thereafter, acid addition is initiated by dosing the slurry with acid from container (220), optionally with continued $CO_2$ bubbling, into the reaction vessel #1 until the pH reaches a set point of about 3.5 to about 5.5, preferably about 4 to about 4.5. It should be appreciated that the acid/$CO_2$ addition process described is not intended to limit the process and instead could comprise the simultaneous introduction of acid and $CO_2$ gas to the slurry or alternatively, the introduction of acid followed by the introduction of $CO_2$, as readily understood by the person skilled in the art. The extraction process can be controlled through the SCADA system, or equivalent thereof, with (a) continuous monitoring of the solution pH and adjustment thereof or (b) with a controlled addition of a predetermined amount of acid and $CO_2$ to achieve the desired pH or (c) both monitoring and dosing with predetermined amounts. Although not wishing to be bound by a particular acid, the acid can be selected from the group consisting of hydrochloric acid, sulfuric acid, and combinations thereof. Advantageously, bubbling the slurry with $CO_2$-enriched gas not only reduces the strong acid demand, thus reducing operating costs, but also agitates the system, resulting in smaller particle sizes and faster nutrient release kinetics. The $CO_2$ gas bubbles can be introduced into the reaction vessel #1 (215) using a diffuser (244) (e.g., perforated pipe, stone, or membrane) (the bubbles are depicted by (242)), or some other equivalent bubble generator. The solution pH can be continually monitored using an optional pH meter or multi-parameter meter (222), which can be interfaced with the SCADA system or equivalent thereof. Alternatively, acid and $CO_2$ can be dosed into the slurry to achieve the desired pH without measuring the pH directly in the reactor. The cumulative contact time for optimal nutrient extraction from the slurry is in a range from about 10 minutes to about 200 minutes, preferably about 20 minutes to about 35 minutes, and can be conducted in continuous flow or sequencing batch mode. In a preferred embodiment, reaction vessel #1 is devoid of any solid-liquid separator comprising a membrane, for example a membrane module as defined herein.

Following the time of nutrient extraction, the valve (250) is opened to release the contents of reaction vessel #1 (215) into at least one solid-liquid separation module (255), e.g., a vibratory dewatering sieve, a settling tank, a centrifuge, a gravity belt thickener, or the like. The at least one solid-liquid separation module (255) effectuates the separation of the contents of reaction vessel #1 (215) into a substantially solid fraction and a substantially liquid fraction. It should be appreciated that some liquid may be present in the substantially solid fraction and some solid may be present in the substantially liquid fraction. Solid-liquid separation modules include, but are not limited to, gravity settling, processes using enhanced settling (e.g., addition of coagulation and flocculation agents), processes using physical separation (e.g., sieve, screen, vibratory dewatering sieve, centrifuge, flotation, hydrocyclone, mesh screening), processes using dewatering operations (e.g., belt press, screw press, filter press, gravity belt thickener, gravity filtration device, vacuum filtration device), and combinations of two or more of said modules. Advantageously, if the solid-liquid separation module is a vibratory dewatering sieve, separation is achieved using gravity, and the liquid can pass through the sieve into the precipitation reaction vessel #2 (285), without the need for a pump positioned between reaction vessel #1 (215) and reaction vessel #2 (285). It should be appreciated however that a pump may be positioned between reactor #1 (215) and reaction vessel #2 (285) if necessary for a specific separation or equipment configuration. Another embodiment of the solid-liquid separation module employs a combination of enhanced settling with a vibratory dewatering sieve. It should be appreciated that if there is more than one solid-liquid separation module downstream of reaction vessel #1 that the modules can be arranged in parallel or in series. The nutrient-deficient solids separated from the liquid in the at least one solid-liquid separation module (255) can be directed to a solids collection line controlled by a valve (265) and in communication with a container (260). The solids can be used in separate energy recovery operations.

Nutrient-rich extract (i.e., the substantially liquid fraction) from the at least one solid-liquid separation module (255) is directed into reaction vessel #2 (285) for precipitation processing. Struvite precipitation occurs in reaction vessel #2 (285) by increasing the pH to a set point in a range of greater than 7.0 to about 10, preferably about >7.0 to about 7.5, about 7.5 to about 8.0 or about 8.0 to about 9.2. The precipitation step is achieved by dosing the nutrient-rich extract with base from container (290), and optionally bubbling with air (300), into the reaction vessel #2 until the pH reaches the preferred set point. Alternatively, the precipitation step is achieved by dosing the nutrient-rich extract with base from container (290) while simultaneously removing the $CO_2$ from the nutrient-rich liquid by vacuum degassing, instead of sparging with air, until the pH reaches the preferred set point. In a preferred embodiment, the precipitation step is achieved by introducing at least one base to the nutrient-rich extract while simultaneously (i) bubbling with air or (ii) vacuum degassing. Although not wishing to be bound by a particular base, the base can be selected from the group consisting of sodium hydroxide, potassium hydroxide, magnesium hydroxide, magnesium oxide and combinations thereof, preferably sodium hydroxide or magnesium oxide. As in reaction vessel #1, this process can be controlled through the SCADA system, or equivalent thereof, with (a) continuous monitoring of the solution pH and adjustment thereof or (b) through controlled addition of a predetermined amount of base and air to achieve the set point pH or (c) both monitoring and dosing with predetermined amounts. Using the system, concentrated base from container (290) can be introduced into reaction vessel #2 (285) until the pH approaches about 7.0. Mixing using a rapid overhead mixer (330) or a paddle-type mixer occurs to facilitate uniform conditions within the reactor. Air (302) can be sparged into the reactor through a diffuser (304) (e.g., perforated pipe, stone or membrane) with continued base addition until the pH setpoint is attained. The pH can be continually monitored using a pH meter or multi-parameter meter (292), which can be interfaced with the SCADA system or equivalent thereof. Alternatively, base and air can be dosed into the nutrient-rich extract to achieve the set point pH without measuring the pH directly in the reaction vessel. Advantageously, air sparging facilitates growth of struvite particles, which benefits physical recovery and separation of the recovered products, and strips excess $CO_2$ from the system, increasing the pH of the liquid in reaction vessel #2 (285). During this precipitation process, mixing can be employed to facilitate particle growth without causing attrition. Precipitation occurs rapidly once the setpoint is reached and contact time in a range of about 5 minutes to about 60 minutes, preferably about 10 minutes to about 30 minutes, facilitates substantial precipitation. Alternatively, or in addition to base dosing, the precipitation step can be achieved by adding a component of the target precipitate to the nutrient-rich extract. In a preferred embodiment, reactor #2 is devoid of any solid-liquid separator comprising a membrane, for example a membrane module as defined herein.

Nutrient-laden struvite solids have a higher density than the remainder of the contents of reaction vessel #2 (285) and as such, will settle and can be collected directly in container (295) following the opening of valve (305). Alternatively, the struvite solids from reaction vessel #2 (285) are introduced to at least one solid-liquid separation module (360) including, but not limited to, processes using gravity settling, enhanced settling (e.g., addition of coagulation and flocculation agents), processes using physical separation (e.g., sieve, screen, vibratory dewatering sieve, centrifuge, flotation, hydrocyclone, mesh screening), processes using dewatering operations (e.g., belt press, screw press, filter press, gravity belt thickener, gravity filtration device, vacuum filtration device), and combinations of two or more of said modules, prior to collection in the container (295). For example, the solids from reaction vessel #2 (285) can be introduced to a conveyer/dewatering system, as readily understood to the skilled artisan, to remove additional liquid prior to introduction of the struvite solids to a container (295), e.g., a bulk bag. Optionally, a pump can be positioned downstream of valve (305) to assist with the movement of solids. Low-phosphorus, but nitrogen- and potassium-rich effluent remaining in reaction vessel #2 (285) can optionally be recycled via conduit (350) to reaction vessel #1 (215) as the makeup water for the next stage of recovery. Optionally, a pump (352) can be positioned along conduit (350) to assist in the movement of the effluent from reaction vessel #2 (285) to reaction vessel #1 (215). Advantageously, up to ten stages of recycle of effluent, or more, can be employed without a drop in overall phosphorus recovery. The low phosphorus, but nitrogen- and potassium-rich effluent can be used as a liquid fertilizer for irrigation or sent to wastewater treatment, after one cycle through the system or after recycling through the system.

In one embodiment, the phosphorus extraction and recovery system (PEARS v2) comprises an extraction reaction vessel and a precipitation reaction vessel, which are in liquid communication with one another. Both reaction vessels can include at least a mixer and optionally a multi-parameter meter. A slurry can be prepared in, or delivered to, the extraction reaction vessel, wherein the slurry comprises manure, sewage sludge, or other nutrient-rich organic material. Extraction is achieved using $CO_2$ and/or acid introduction, preferably both. Following extraction, the liquid comprising valuable nutrients can be separated from the solids using at least one solid-liquid separation module and said acidic liquid can be directed to the precipitation reaction vessel. A base can be delivered to the precipitation reaction vessel for combination with the liquid so that struvite and/or potassium struvite precipitation occurs. The solids (struvite and/or potassium struvite) in the precipitation reaction vessel can be separated from the liquid.

Figure 3:
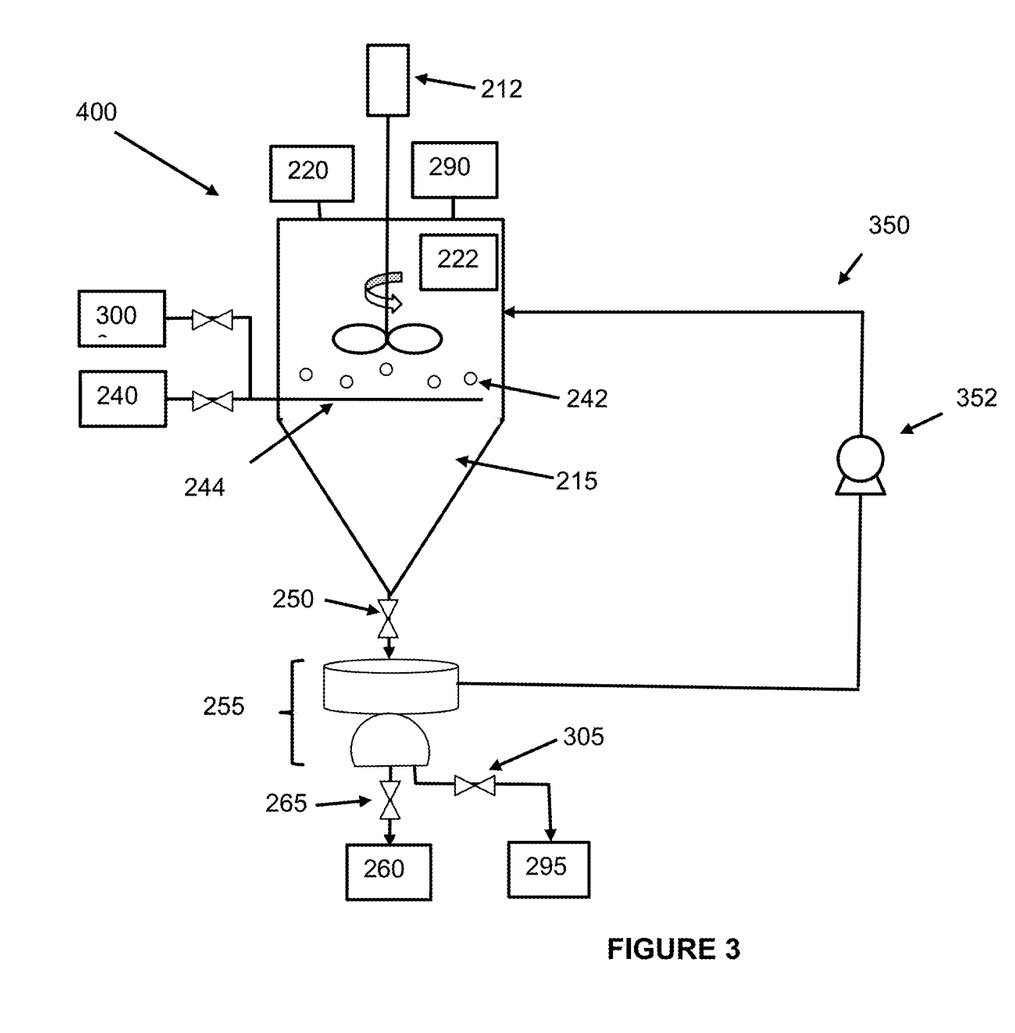
FIG. 3 is a schematic of a second embodiment of the PEARS v2 system.

In another embodiment of the first aspect, as illustrated in FIG. 3, the system comprises only one reaction vessel, wherein extraction and precipitation are carried out in the same reaction vessel, at separate times in the process. The one reaction vessel system (400) comprises many of the same components as the two reaction vessel system of FIG. 1, for example, a reaction vessel (215), a mixer (212), acid container (220), base container (290), an optional multi-parameter meter (222), a source of $CO_2$ (240), a source of air (300), a diffuser (244), at least one solid-liquid separation module (255), a nutrient-deficient solids container (260), a struvite solids container (295), and conduit (350). The premise of operation of the system and process is identical to that of the system of FIG. 1, but instead of moving the nutrient-rich extract from the solid-liquid separation module to reaction vessel #2, in the system of FIG. 3, said nutrient-rich extract is redirected to the partially- or fully-emptied reaction vessel (215) for precipitation of struvite solids therein. It should be appreciated that the conduit (350) can have a volume large enough to accommodate all of the liquid in the process, or alternatively an optional container can be incorporated along the conduit between the solid-liquid separation module (255) and the reaction vessel (215) for temporary storage of the liquid prior to reintroduction in the reaction vessel (215).

Importantly, the placement of specific components in the system of FIGS. 1 and 3 is for illustrative purposes only. The person skilled in the art will understand how to adapt the placement of same without altering the essence of the system.

Advantageously, the apparatus of the first aspect does not require the inclusion of membrane modules, as defined herein, in either reaction vessel (#1 or #2). Another advantage includes the elimination of the basin (30) for preparation of the slurry outside of reaction vessel #1. By incorporating the at least one solid-liquid separation module in the apparatus, unnecessary pumps and sensors can be removed. Furthermore, a higher extraction efficiency can be achieved due to improved mixing and improved recovery of nutrient-rich extracts from the solid-liquid separation module.

As noted, several components of the system can be in communication with the SCADA system or equivalent thereof. For example, at least one of the multi-parameter meters (222, 292), the mixers (212, 330), the containers (220, 290), and the valves (250, 265, 305) can be in communication with the SCADA system, or equivalent thereof. Preferably, both multi-parameter meters (222, 292), both mixers (212, 330), both containers (20, 90), and all the pumps (60, 80, 110, and 140) are in communication with the SCADA system, or equivalent thereof.

Potential for further treatment and resource recovery includes, but is not limited to, ammonia scrubbing and manure-to-energy (not shown). For example, for ammonia scrubbing, the air (302) sparging during precipitation in reactor #2 (285) allows for the separate recovery of ammonia from a vent at the top of the reactor (not shown), said vent leading to a scrubber (not shown).

In one embodiment of the first aspect, the phosphorus extraction and recovery system (PEARS v2) comprises:
(a) at least one reaction vessel comprising a mixer, wherein the at least one reaction vessel and the mixer are substantially inert to an acidic solution, a basic solution, or both;
(b) at least one solid-liquid separation module in fluid communication with at least one reaction vessel, wherein the at least one solid-liquid separation module separates contents of at least one reaction vessel into a substantially solid fraction and a substantially liquid fraction;
(c) at least one container in communication with at least one solid-liquid separation module, wherein solids from the at least one solid-liquid separation module are collected in the at least one container; and
(d) optionally a liquid conduit connecting at least one reaction vessel to at least one solid-liquid separation module for directing liquid from at least one solid-liquid separation module to at least one reaction vessel.

In a preferred embodiment, the at least one reaction vessel is devoid of any solid-liquid separator comprising a membrane, for example a membrane module as defined herein.

In another embodiment of the first aspect, the phosphorus extraction and recovery system (PEARS v2) comprises:
(a) an extraction reaction vessel comprising a first mixer, wherein each of the components of the extraction reaction vessel are substantially inert to an acidic solution;
(b) a first solid-liquid separation module in fluid communication with the extraction reaction vessel, wherein the first solid-liquid separation module separates contents of the extraction reaction vessel into a substantially solid fraction and a substantially liquid fraction;
(c) a precipitation reaction vessel positioned to receive the substantially liquid fraction from the first solid-liquid separation module, wherein the precipitation reaction vessel comprises a second mixer, wherein each of the components of the precipitation reaction vessel are substantially inert to a basic solution;
(d) a second solid-liquid separation module in fluid communication with the precipitation reaction vessel, wherein the second solid-liquid separation module separates contents of the precipitation reaction vessel into a substantially solid fraction and a substantially liquid fraction; and
(e) an optional liquid conduit connecting the second solid-liquid separation module to the extraction reaction vessel for directing liquid from the second solid-liquid separation module to the extraction reaction vessel.

In a preferred embodiment, the extraction reaction vessel and/or the precipitation reaction vessel, preferably both, are devoid of any solid-liquid separator comprising a membrane, for example a membrane module as defined herein.

In yet another embodiment of the first aspect, the phosphorus extraction and recovery system (PEARS v2) comprises:
(a) a reaction vessel comprising a mixer, wherein the reaction vessel and the mixer are substantially inert to an acidic solution and a basic solution;
(b) a solid-liquid separation module in fluid communication with the reaction vessel, wherein the solid-liquid separation module separates contents of the reaction vessel into a substantially solid fraction and a substantially liquid fraction;

(c) at least one container in communication with the solid-liquid separation module, wherein solids from the solid-liquid separation module are collected in the at least one container; and (d) a liquid conduit connecting the reaction vessel to the solid-liquid separation module for directing liquid from the solid-liquid separation module to the reaction vessel.

In a preferred embodiment, the reaction vessel is devoid of any solid-liquid separator comprising a membrane, for example a membrane module as defined herein.

In still another embodiment of the first aspect, the phosphorus extraction and recovery system (PEARS v2) comprises:

(a) an extraction reaction vessel comprising a first mixer and a carbon dioxide bubbler, wherein each of the components of the extraction reaction vessel are substantially inert to an acidic solution;

(b) at least one solid-liquid separation module in liquid slurry communication with the extraction reaction vessel, wherein the at least one solid-liquid separation module separates contents of the extraction reaction vessel into a substantially solid fraction and a substantially liquid fraction;

(c) a precipitation reaction vessel positioned to receive the substantially liquid fraction from the at least one solid-liquid separation module, wherein the precipitation reaction vessel comprises a second mixer and an air bubbler, wherein each of the components of the precipitation reaction vessel are substantially inert to a basic solution;

(d) a second solid-liquid separation module in fluid communication with the precipitation reaction vessel, wherein the second solid-liquid separation module separates contents of the precipitation reaction vessel into a substantially solid fraction and a substantially liquid fraction; and (e) an optional liquid conduit connecting the second solid-liquid separation module to the extraction reaction vessel for directing liquid from the second solid-liquid separation module to the extraction reaction vessel, wherein the PEARS system further comprises at least one of:

(i) a first container in liquid communication with the extraction reaction vessel, wherein the first container is fabricated of material that is inert to an acidic solution; and/or (ii) a second container in liquid communication with the precipitation reaction vessel, wherein the second container is fabricated of material that is inert to a basic solution;

(iii) a third container in communication with the second solid-liquid separation module, wherein solids from the second solid-liquid separation module are collected in the third container; and/or (iv) a fourth container in communication with the at least one solid-liquid separation module, wherein solids from the first solid-liquid separation module are collected in the fourth container.

In a preferred embodiment, the extraction reaction vessel and/or the precipitation reaction vessel, preferably both, are devoid of any solid-liquid separator comprising a membrane, for example a membrane module as defined herein.

In a second aspect, a process for treating manure, sewage sludge, or other nutrient-rich organic material in order to isolate a target precipitate is described, the process comprising:

(a) introducing a slurry in an extraction reaction vessel, wherein pH of the slurry is lowered to a range of about 3.5 to about 5.5, wherein the slurry is mixed in the extraction reaction vessel to instigate nutrient release from the slurry, wherein the slurry comprises manure, sewage sludge, or other nutrient-rich organic material;

(b) separating the slurry into a nutrient-rich liquid and a nutrient-deficient solid using at least one solid-liquid separation module;

(c) directing the nutrient-rich liquid to a precipitation reaction vessel;

(d) inducing precipitation of a target precipitate in the precipitation reaction vessel by raising pH of the nutrient-rich liquid to a range of greater than 7.0 to about 10; and (e) collecting the target precipitate from the precipitation reaction vessel;

wherein the extraction reaction vessel and the precipitation reaction vessel are the same vessel or two different vessels. Preferably, the target precipitate comprises struvite and/or potassium struvite. Additionally, preferably, no additional chemicals, other than the at least one acid (and $CO_2$) and at least one base (and air) are added to the process. In one embodiment, the process of the second aspect uses the system of PEARS v2. In a preferred embodiment, the extraction reaction vessel and/or the precipitation reaction vessel, preferably both, are devoid of any solid-liquid separator comprising a membrane, for example a membrane module as defined herein.

In one embodiment of the second aspect, the process for treating manure, sewage sludge, or other nutrient-rich organic material in order to isolate a target precipitate is described, the process comprising:

(a) introducing a slurry in an extraction reaction vessel, wherein pH of the slurry is lowered to a range of about 3.5 to about 5.5, wherein the slurry is mixed in the extraction reaction vessel to instigate nutrient release from the slurry, wherein the slurry comprises manure, sewage sludge, or other nutrient-rich organic material;

(b) separating the slurry into a nutrient-rich liquid and a nutrient-deficient solid using at least one solid-liquid separation module;

(c) directing nutrient-rich liquid to a precipitation reaction vessel;

(d) inducing precipitation of a target precipitate in the precipitation reaction vessel by raising pH of the nutrient-rich liquid to a range of greater than 7.0 to about 10;

(e) collecting the target precipitate from the precipitation reaction vessel; and (f) optionally directing effluent from the precipitation reaction vessel to the extraction reaction vessel for reuse.

Preferably, the target precipitate comprises struvite and/or potassium struvite. Additionally, preferably, no additional chemicals, other than the at least one acid (and $CO_2$) and at least one base (and air) are added to the process. In one embodiment, the process of the second aspect uses the system of PEARS v2. In a preferred embodiment, the extraction reaction vessel and/or the precipitation reaction vessel, preferably both, are devoid of any solid-liquid separator comprising a membrane, for example a membrane module as defined herein.

In another embodiment of the second aspect, the process for treating manure, sewage sludge, or other nutrient-rich organic material in order to isolate a target precipitate is described, the process comprising:
(a) introducing a slurry in a reaction vessel, wherein pH of the slurry is lowered to a range of about 3.5 to about 5.5, wherein the slurry is mixed in the reaction vessel to instigate nutrient release from the slurry, wherein the slurry comprises manure, sewage sludge, or other nutrient-rich organic material;
(b) separating the slurry into a nutrient-rich liquid and a nutrient-deficient solid using at least one solid-liquid separation module;
(c) directing the nutrient-rich liquid to the reaction vessel;
(d) inducing precipitation of a target precipitate in the reaction vessel by raising pH of the nutrient-rich liquid to a range of greater than 7.0 to about 10; and
(e) collecting the target precipitate from the reaction vessel.

Preferably, the target precipitate comprises struvite and/or potassium struvite. Additionally, preferably, no additional chemicals, other than the at least one acid (and $CO_2$) and at least one base (and air) are added to the process. In one embodiment, the process of the second aspect uses the system of PEARS v2. It should be appreciated that the reaction vessel has been emptied prior to introduction of the nutrient-rich liquid to the reaction vessel in step (c). In a preferred embodiment, the reaction vessel is devoid of any solid-liquid separator comprising a membrane, for example a membrane module as defined herein.

Advantageously, the PEARS v2 system and process is capable of (i) reducing the poultry litter and other particulates in the final struvite-containing product, (ii) lowering the acid demand associated with nutrient release by bubbling $CO_2$-containing gas into the slurry, (iii) lowering the base demand associated with struvite precipitation by bubbling air to release dissolved $CO_2$, (iv) higher operational consistency, (v) increased extraction and precipitation efficiency, (vi) struvite and potassium struvite are produced from poultry litter extracts without additional/external chemical addition (e.g., $Mg^{2+}$, $NH_4^+$, $K^+$, $Ca^{2+}$), (vii) recycling the process effluent over at least 10 stages/cycles, (viii) increasing phosphorus recovery in the form of struvite minerals, (ix) decreasing water consumption, and (x) generating a high-strength liquid fertilizer with a high $NH_4^+$ and $K^+$ content.

The precipitated nutrient-rich minerals can be utilized as a slow release fertilizer either as a specialty fertilizer or blended into main agricultural fertilizers. Notably, even when applied at relatively high application rates, struvite can act as a slow release fertilizer without damaging plant roots and leaching potential is low. The process can be controlled by adjusting the pH of the precipitation reactor, changing the extent of aeration in the precipitation reactor, or adding components of the desired product to the precipitation reactor to generate predominantly struvite or potassium struvite.

Livestock manure, besides containing a mixture of feces and urine, may also include wasted feed, bedding and water (including, but not limited to, spilled water, flush water, wash water, and precipitation). Manure characteristics are generally affected by diet, species, and the growth stage of the animals, and the manure collection method used, including the amount of water added to dilute the waste. Typically, animal manure is about 80% to about 95% liquid by weight due to urine, sloppy drinking, animal washing, and flush water. As such, the manure slurry may be pretreated to remove any unwanted material, larger solids, and excess liquids from the manure medium before introduction into the PEARS system described herein, wherein the pretreating includes systems such as a screw press, centrifuge, vibrating screen, mesh screening, belt filter, hydrocyclone, and other systems that may further reduce particle size, and/or remove unwanted large material to ensure easy flow into and through the PEARS system.

Further, the manure or other nutrient-rich material may be pretreated or post treated in an anaerobic digester, which includes holding manure or other nutrient-rich material in an air-tight tank that is heated to about 100 degrees Fahrenheit. Bacteria in the manure or other nutrient-rich material thrive in these conditions and they consume solids while releasing biogas. Naturally occurring bacteria will degrade the volatile solids, releasing a combination of carbon dioxide ($CO_2$) and methane ($CH_4$) that may be burned/combusted for energy production or purified and used as a low carbon intensity substitute for natural gas. Further, the $CO_2$ can be collected for use in the PEARS system in the acidification reactor (when used). Digestion does not reduce the nutrients in the manure or other nutrient-rich material, although it may alter the form of the nitrogen (more ammonia) and phosphorus (more orthophosphate).

The features and advantages of the invention are more fully illustrated by the following non-limiting examples, wherein all parts and percentages are by weight, unless otherwise expressly stated.

Example 1

Using the system of FIG. 1 (i.e., PEARS v2), the following experiment was performed. A manure slurry was prepared by adding 1000 g of dry, sieved (#8 mesh) poultry litter and 25 L of tap water into the extraction reactor (215). The slurry was mixed at 300 rpm for 12 min. Then, $CO_2$ (g) was bubbled for 5 min under continuous mixing until the pH was approximately 6. To maximize extraction, 3 M HCl was dosed to reach pH 4.2 and mixing continued for 10 min. After solid-liquid separation, the nutrient-rich extract was transferred into the precipitation reactor (285). NaOH (3 M) was added with continuous aeration and mixing until pH 7. Then, the pH was increased to 8.8 to precipitate struvite. The struvite particles were settled for 15 min before collection and analysis. To limit wastewater volume, the process effluent from the precipitation reactor was recycled back to the extraction reactor for the extraction of the next poultry litter slurry.

Starting with an amount of poultry litter in 25 L of water, it was unexpectedly discovered that the overall orthophosphate (P(V)) recovery efficiency using the PEARS v2 system was approximately 80%, which is an improvement relative to systems in the prior art. Without being bound by theory, it is thought that the increased efficiency of PEARS v2 is due to improved mixing in the extraction reactor and improved recovery of nutrient-rich extract by the vibratory sieve. Furthermore, other advantages include, but are not limited to, improved reproducibility, lower operational time, increased nutrient retention, and almost a doubling of throughput.

Figure 2:
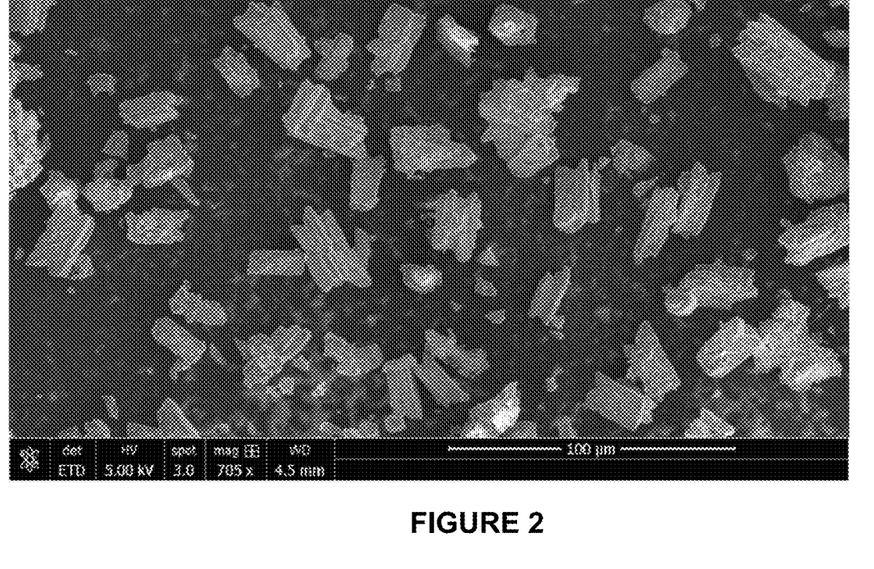
FIG. 2 is a SEM micrograph of the products recovered using the second embodiment of the PEARS system, wherein the products comprise mostly struvite.

Referring to FIG. 2, an SEM micrograph of the recovered products using the PEARS v2 system and process is shown. The P:Mg, P:K, and Ca:P ratios were 1.2, 3.6 and 0.1, respectively. The recovered products have the morphology and composition of struvite, included some potassium, but low calcium, which suggests that the recovered products will be suitable as slow-release fertilizers.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A phosphorus extraction and recovery system (PEARS) system comprising:
   (a) a reaction vessel comprising a mixer and a gas diffuser positioned within the reaction vessel, wherein the reaction vessel and the mixer are substantially inert to both an acidic solution and a basic solution;
   (b) at least one solid-liquid separation module in fluid communication with the reaction vessel, wherein the at least one solid-liquid separation module separates contents of the reaction vessel into a substantially solid fraction and a substantially liquid fraction;
   (c) at least one container in communication with at least one solid-liquid separation module, wherein the substantially solid fraction from the at least one solid-liquid separation module is collected in the at least one container; and
   (d) a liquid conduit connecting the reaction vessel to at least one solid-liquid separation module for directing the substantially liquid fraction from at least one solid-liquid separation module to the reaction vessel,
   wherein the reaction vessel is devoid of any solid-liquid separator comprising a membrane.

2. A phosphorus extraction and recovery system (PEARS) system comprising:
   (a) an extraction reaction vessel comprising a first mixer and a gas diffuser positioned within the extraction reaction vessel, wherein each of the components of the extraction reaction vessel are substantially inert to an acidic solution;
   (b) at least one first solid-liquid separation module in fluid communication with, and downstream of, the extraction reaction vessel, wherein the at least one first solid-liquid separation module separates contents of the extraction reaction vessel into a first substantially solid fraction and a first substantially liquid fraction;
   (c) a precipitation reaction vessel positioned to receive the substantially liquid fraction from the at least one first solid-liquid separation module, wherein the precipitation reaction vessel comprises a second mixer, wherein each of the components of the precipitation reaction vessel are substantially inert to a basic solution;
   (d) at least one second solid-liquid separation module in fluid communication with, and downstream of, the precipitation reaction vessel, wherein the at least one second solid-liquid separation module separates contents of the precipitation reaction vessel into a second substantially solid fraction and a second substantially liquid fraction; and
   (e) an optional liquid conduit fluidly connecting the at least one second solid-liquid separation module to the extraction reaction vessel for directing liquid from the at least one second solid-liquid separation module to the extraction reaction vessel,
   wherein the extraction reaction vessel, the precipitation reaction vessel, or both, is devoid of any solid-liquid separator comprising a membrane.

3. The PEARS system of claim 2, further comprising at least one of:
   (i) a first container in liquid communication with the extraction reaction vessel, wherein the first container is fabricated of material that is inert to an acidic solution;
   (ii) an air bubbler;
   (iii) a second container in liquid communication with the precipitation reaction vessel, wherein the second container is fabricated of material that is inert to a basic solution;
   (iv) a third container in communication with the second solid-liquid separation module, wherein solids from the at least one second solid-liquid separation module are collected in the third container;
   (v) a fourth container in communication with the at least one first solid-liquid separation module, wherein solids from the first solid-liquid separation module are collected in the fourth container;
   (vi) at least one pump positioned between the precipitation reaction vessel and the extraction reaction vessel;
   (vii) at least one pump positioned between the precipitation reaction vessel and the third container;
   (viii) a first multi-parameter meter positioned in the extraction reaction vessel;
   (ix) a second multi-parameter meter positioned in the precipitation reaction vessel;
   (x) an ammonia scrubbing module in gaseous communication with the precipitation reaction vessel; and/or
   (xi) a manure-to-energy module positioned downstream of the fourth container.

4. The PEARS system of claim 2, wherein the system does not require a pump positioned between the precipitation reaction vessel and the extraction reaction vessel.

5. The PEARS system of claim 2, wherein the at least one first and the second solid-liquid separation modules comprise, independently of one another, at least one device selected from the group consisting of a gravity settler, a coagulator, a sieve, a screen, a vibratory dewatering sieve, a centrifuge, a flotation, a hydrocyclone, mesh screening, a belt press, a gravity belt thickener, a screw press, a filter press, gravity filtration device, vacuum filtration device, and any combination thereof.

6. The PEARS system of claim 2, wherein the at least one first solid-liquid separation module comprises a vibratory dewatering sieve.

7. The PEARS system of claim 2, comprising an air bubbler, wherein the air bubbler comprises an air diffuser positioned within the precipitation reaction vessel.

8. The PEARS system of claim 3, further comprising a supervisory control and data acquisition (SCADA) system in communication with at least one of the first multi-parameter meter, the first mixer, the first container, the second multi-parameter meter, the second mixer, the second container, the third container, the fourth container, the gas diffuser, the air bubbler, and the pumps.

9. A process for treating manure, sewage sludge, or other nutrient-rich organic material using the PEARS system of claim 2 to isolate a target precipitate from a slurry comprising manure, sewage sludge, or other nutrient-rich material, the process comprising:
   (a) introducing the slurry in the extraction reaction vessel, wherein pH of the slurry is lowered to a range of about 3.5 to about 5.5 using at least carbon dioxide gas introduced via the gas diffuser, wherein the slurry is mixed in the extraction reaction vessel to instigate nutrient release from the slurry;

(b) separating the acidified slurry into a nutrient-rich liquid and a nutrient-deficient solid using the at least one first solid-liquid separation module;

(c) directing the nutrient-rich liquid to the precipitation reaction vessel;

(d) inducing precipitation of the target precipitate in the precipitation reaction vessel by raising pH of the nutrient-rich liquid to a range of greater than 7.0 to about 10; and (e) collecting the target precipitate from the precipitation reaction vessel.

10. The process of claim 9, further comprising adding at least one acid to the extraction reaction vessel to assist in the achievement of the pH range of about 3.5 to about 5.5.

11. The process of claim 9, wherein the pH of the nutrient-rich liquid is raised to about 8.0 to about 9.2.

12. The process of claim 9, wherein no pump is positioned between the precipitation reaction vessel and the extraction reaction vessel.

13. The process of claim 9, wherein the at least one first solid-liquid separation module comprises at least one device selected from the group consisting of a gravity settler, a coagulator, a sieve, a screen, a vibratory dewatering sieve, a centrifuge, a flotation, a hydrocyclone, mesh screening, a belt press, a gravity belt thickener, a screw press, a filter press, gravity filtration device, vacuum filtration device, and any combination thereof.

14. The process of claim 9, wherein the at least one first solid-liquid separation module comprises a vibratory dewatering sieve.

15. The process of claim 9, wherein the target precipitate comprises struvite and/or potassium struvite.

16. The process of claim 9, wherein the steps (a) through (e) can be repeated more than once.

17. The process of claim 9, wherein the pH of the nutrient-rich liquid is achieved using at least one base and/or while sparging the nutrient-rich liquid with air.

18. The process of claim 9, wherein the target precipitate is collected using the second solid-liquid separation module.

19. A process for treating manure, sewage sludge, or other nutrient-rich organic material using the PEARS system of claim 1 to isolate a target precipitate from a slurry comprising manure, sewage sludge, or other nutrient-rich material, the process comprising:

(a) introducing the slurry in the reaction vessel, wherein pH of the slurry is lowered to a range of about 3.5 to about 5.5 using at least carbon dioxide gas introduced via the gas diffuser, wherein the slurry is mixed in the reaction vessel to instigate nutrient release from the slurry;

(b) separating the acidified slurry into a nutrient-rich liquid and a nutrient-deficient solid using the at least one solid-liquid separation module;

(c) directing the nutrient-rich liquid back to the reaction vessel;

(d) inducing precipitation of the target precipitate in the reaction vessel by raising pH of the nutrient-rich liquid to a range of greater than 7.0 to about 10; and (e) collecting the target precipitate from the reaction vessel.

20. The process of claim 19, wherein the at least one solid-liquid separation module comprises a vibratory dewatering sieve.

* * * * *